Figure 1:
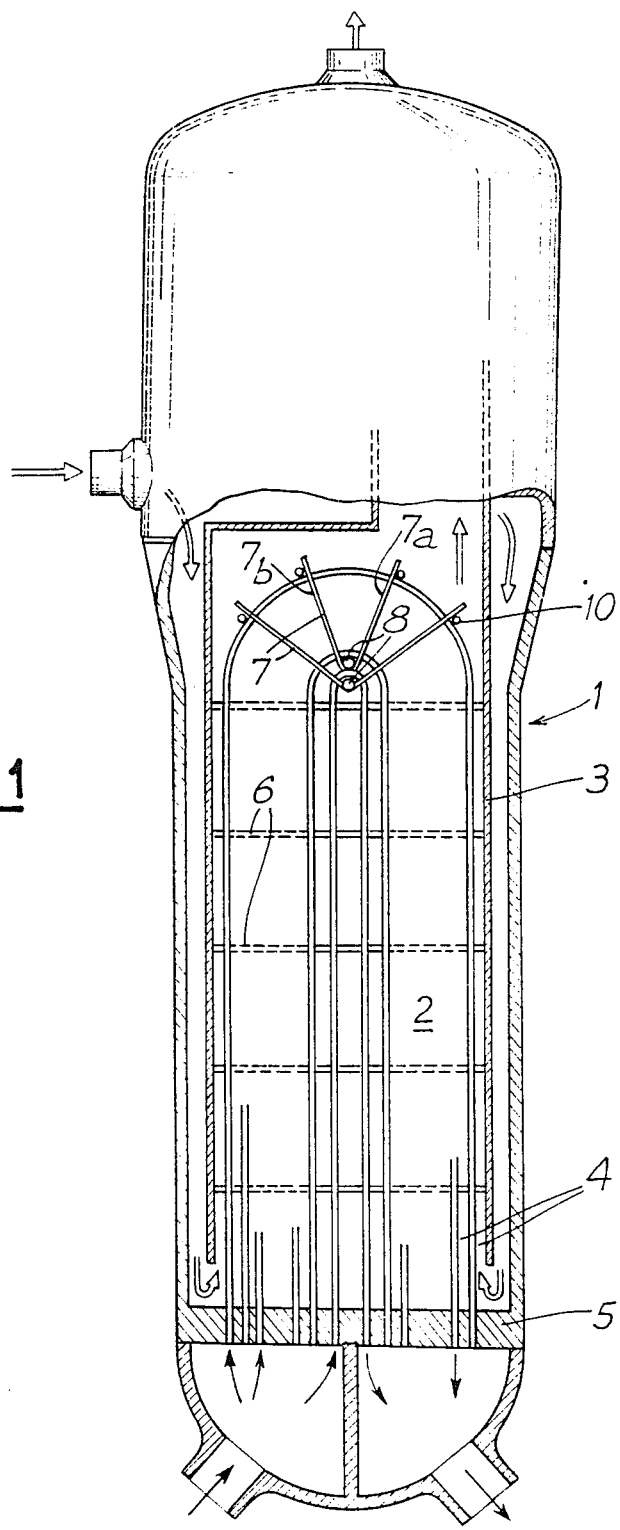

United States Patent [19]

Malaval

[11] Patent Number: 4,860,697
[45] Date of Patent: Aug. 29, 1989

[54] APPARATUS FOR THE ANTIVIBRATORY WEDGING OF COMPONENT PARTS OF AN INSTALLATION, AND IN PARTICULAR ANTIVIBRATORY BARS FOR WEDGING THE TUBES OF A STEAM GENERATOR

[75] Inventor: Claude Malaval, Antony, France

[73] Assignee: Framatome, Courbevoie, France

[21] Appl. No.: 220,710

[22] Filed: Jul. 18, 1988

[30] Foreign Application Priority Data

Jul. 17, 1987 [FR] France ............................. 87 10158

[51] Int. Cl.$^4$ ............................................. F22B 37/24
[52] U.S. Cl. ..................................... 122/510; 165/69; 165/162
[58] Field of Search ................. 122/32, 510, 511, 512; 165/69, 162

[56] References Cited

U.S. PATENT DOCUMENTS

| | | | |
|---|---|---|---|
| 4,105,067 | 8/1978 | Bovagne | 165/162 X |
| 4,640,342 | 2/1987 | Appleman | 122/510 X |
| 4,653,576 | 3/1987 | Lagally | 165/69 |
| 4,720,840 | 1/1988 | Lagally, et al. | 165/69 X |

FOREIGN PATENT DOCUMENTS 2174484 11/1986 United Kingdom .

Primary Examiner—Steven E. Warner
Attorney, Agent, or Firm—Pollock, Vande Sande & Priddy

[57] ABSTRACT

The apparatus comprises wedging members (12, 13) consisting of elastic metal strips folded into crenellations, and a wedging member cooperating with said members and consisting of a flat strip (14) provided with openings (20) having the same spacing as the crenellations of the wedging members (12, 13). The wedging members (12, 13) have outer support surfaces (16) and inner support surfaces (17) cooperating with the flat strip (14). In the unlocked position of the apparatus the surfaces (17) coincide with the openings (20). In the locked position the members (12, 13) are moved apart by the flat strip (14), which comes into contact with the support surfaces (17). Passage from one position to the other is achieved by longitudinal displacement of the flat strip (14). The apparatus can be used in particular as an antivibratory bar in a steam generator of a pressurized water nuclear reactor.

10 Claims, 4 Drawing Sheets

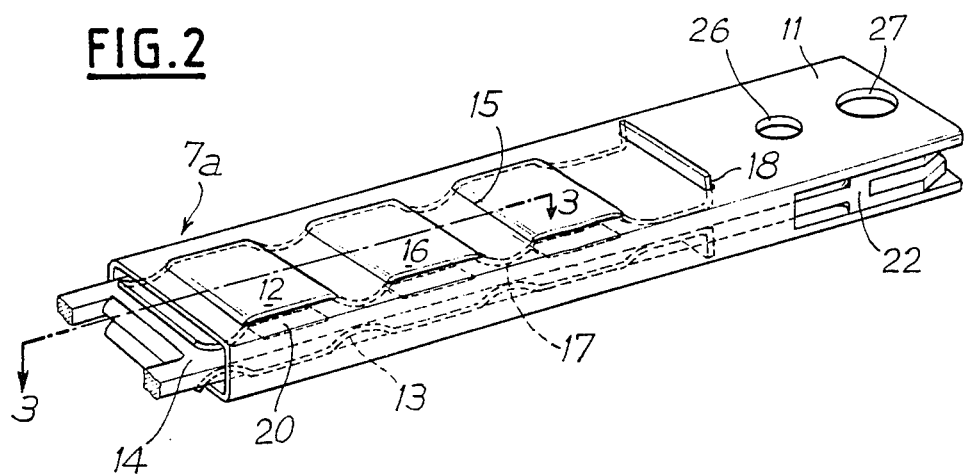
FIG. 2
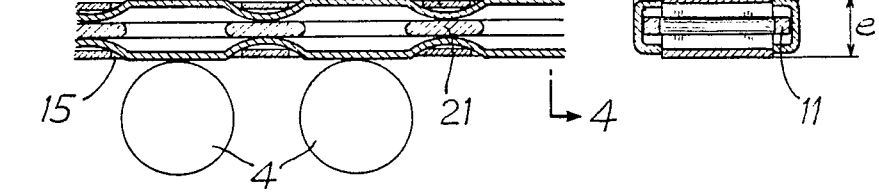
FIG. 3
FIG. 4
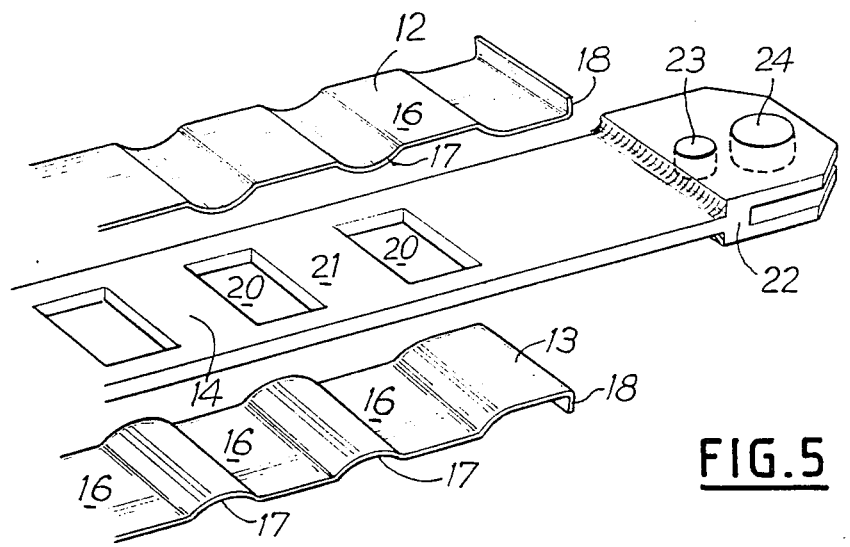
FIG. 5

FIG.9
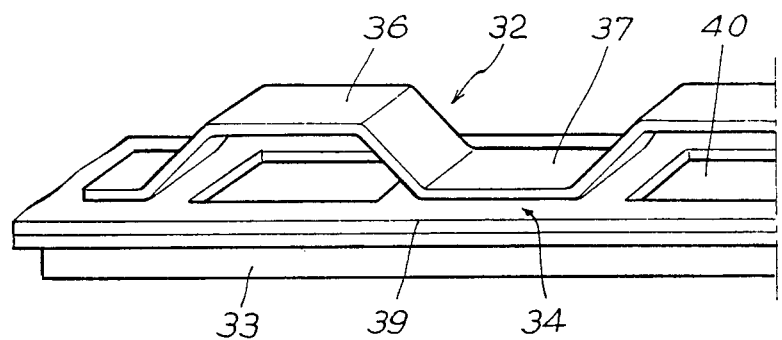
FIG.10
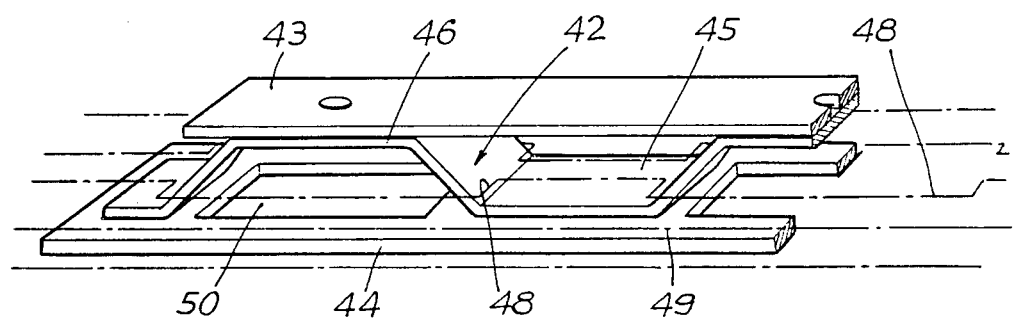
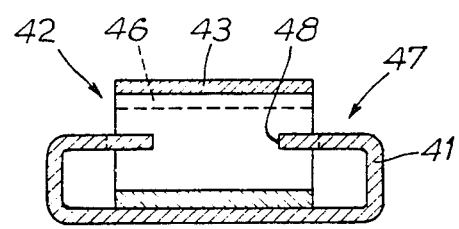
FIG.11

APPARATUS FOR THE ANTIVIBRATORY WEDGING OF COMPONENT PARTS OF AN INSTALLATION, AND IN PARTICULAR ANTIVIBRATORY BARS FOR WEDGING THE TUBES OF A STEAM GENERATOR

The invention relates to an apparatus for the antivibratory wedging of component parts of an installation which are disposed in such a manner as to form successive rows, and in particular to an antivibratory bar effecting the wedging of the tubes of a steam generator of a pressurized water nuclear reacter.

Steam generators of pressurized water nuclear reactors contain a bank of a very large number of tubes, generally several thousand tubes, bent in U-shape so as to have two straight branches and a bend of semicircular shape connecting the two straight branches. The ends of the straight parts of the tubes are fixed in a tube plate and form the bottom part of the bank. The juxtaposed bends of the tubes constitute the top or "chignon" of the bank of tubes.

The tubes of the bank are not identified to one another, since the radius of curvature of the bend varies with the position of the tube in the bank. As a general rule the bends situated in the central part of the bank have a small radius of curvature, and the bends situated on the periphery have a large radius of curvature.

These tubes are disposed in vertical planes parallel to one another and separated by a substantially constant distance corresponding to the distance separating two successive rows of holes in the tube plate.

The straight parts of the tubes are supported in the transverse direction by spacer plates having apertures substantially reproducing the network of through holes in the tube plate. The spacer plates are fixed at their periphery on a cylindrical casing surrounding the bank of tubes.

The top part of the tubes in the bank, comprising successive rows of bends separated by a substantially constant distance, is provided with spacer and wedging members disposed in the spaces formed between two successive rows of tubes.

Not only the spacer plates supporting the straight part of the tubes but also the devices supporting the bends in the "chignon" must permit effective support of the tubes without hindering the circulation of the steam generator feed water in contact with the outer surface of the tubes of the bank. The pressurized primary cooling water of the reactor circulates inside the tubes of the steam generator tube bank and permits the heating and vaporization of the feed water circulating in contact with the outer surface of the tubes.

The circulation at high speed of currents of fluid in contact with the tubes of the bank gives rise to stresses which may lead to the setting up of vibrations in these tubes when the steam generator is in operation. This may result in wear or damage to the tubes in the course of a long period of utilization of the steam generator, particulary at the spacer plates.

For the purpose of supporting the bends in the "chignon" of the tube bank it has been proposed to use wedging devices in the form of antivibratory bars disposed in the spaces between the rows of tube to effect the wedging thereof.

These antivibratory bars must have a thickness less than the width of the spaces separating two successive rows of tubes, in order to enable them to be introduced between the rows of tubes in the "chignon" without difficulty and without displacing or damaging the bends between which the antivibratory bars are inserted.

Furthermore, if manufacturing tolerances of the tubes and antivibratory bars are taken into account, the residual installation clearance for the bars in the "chignon" is still further increased.

The presence of relatively large clearances between the bars and the tubes results in vibration during operation, which is accompanied by shocks and friction which give rise to wear and damage to the tubes.

It has therefore been attempted to use more effective antivibratory bars for the antivibratory wedging of the tubes in the "chignon".

It has for example been proposed to use antivibratory bars which are expansible in the direction of their thickness and which comprise a pair of adjustable rods connected together and adapted to be moved relative to one another between a first position, in which the antivibratory bar has a thickness less than the space between two successive rows of tubes, and a second position in which the antivibratory bar has a thickness greater than that corresponding to the first position of the adjustable rods.

According to French Patent Application No. 2,558,933, each pair of adjustable rods constituting an antivibratory bar comprises complementary rod sections having oblique surface zones placed face to face and forming longitudinal ramps, whose relative displacement permits transverse expansion of the bar.

Devices of this kind are complex in construction and have great rigidity in the transverse direction corresponding to the direction of the thickness of the rows of tubes, so that they are scarcely able to adapt to differences of dimensions, shape or positioning of the tubes in the rows.

Furthermore, with such antivibratory bars it is very difficult to vary the clamping force applied to the tubes, which is defined once and for all by the longitudinal ramps machined on the rods.

Finally, the transverse expansion of the bar is constant over the entire row of tubes, so that in the case where the generatrices of the tubes to which the clamping is applied are not in perfect alignment, the wedging of certain tubes is not effectively achieved.

It has also been proposed to produce antivibratory bars from elongated wedging members disposed in a hollow sectional member and adapted to be moved apart, in such a manner that at least one of the wedging members comes to bear against a row of tubes. The spacing of the wedging members can be achieved automatically when the steam generator is put into service, with the aid of members of shape memorizing alloy bearing against the wedging members. An arrangement of this kind nevertheless makes it necessary to use components whose production and operation are relatively delicate, and the system is not reversible, a factor which does not facilitate their removal when repairs are needed.

The invention therefore seeks to provide an apparatus for the antivibratory wedging of component parts of an installation which are disposed in such a manner as to constitute successive rows separated by a space of substantially constant width, which apparatus is intended to be inserted between two successive rows and is composed of a sectional member having a hollow section, in which are disposed at least two elastic wedging members mounted for movement relative to one another in the longitudinal direction of the sectional member and having complementary operating surfaces and a relative longitudinal displacement means, in such a manner as to be displaced relative to one another both in the longitudinal direction and in the transverse direction corresponding to the direction of the width of the rows, at least one of the wedging members coming to bear against the component parts disposed in a row, said wedging apparatus, which is of simple shape and construction, making it possible to absorb differences of dimensions and anomalies in the positioning of component parts disposed in a row.

To this end, one of the wedging members is in the form of an elastic metal strip folded in such a manner as to form transverse crenellations disposed in succession in the longitudinal direction, and having opposite support faces directed in the one case towards the interior of the sectional support and in the other towards the outside, and a flat strip provided with openings separated by intermediate portions of the flat strip and whose dimensions and arrangement along the length of the flat strip correspond to the dimensions and arrangement of the inner support surfaces of the folded strip; the longitudinal displacement means being associated with the flat strip for the displacement of the latter between an unlocked position, in which the inner support surfaces coincide with the openings in the flat strip, and a locked position in which the inner support surfaces are in contact with the intermediate portions of the flat strip between the openings.

In order to enable the invention to be clearly understood, a description will now be given, by way of non-limitative examples, of various forms of construction of an antivibratory apparatus for a steam generator of a pressurized water nuclear reactor.

Figure 6:
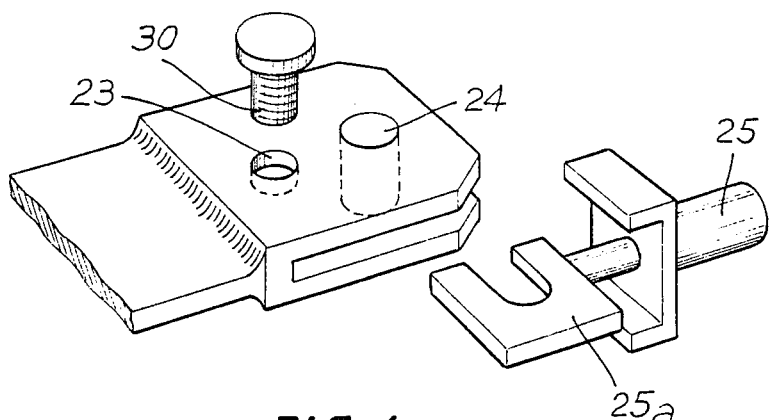
Figure 7:
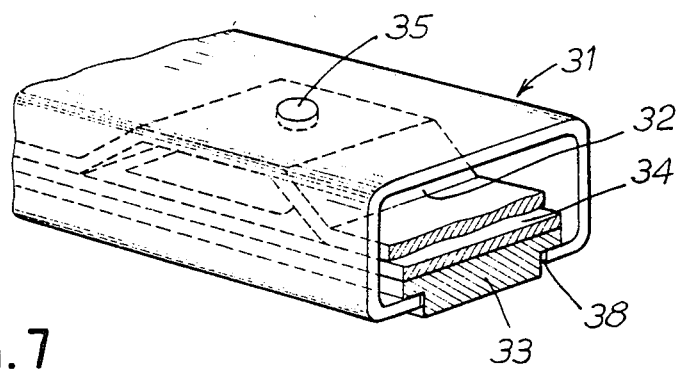
Figure 8:
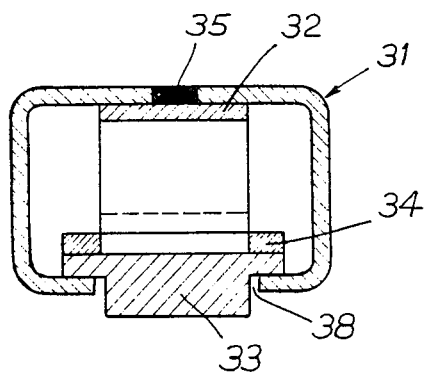

FIG. 1 is a view in elevation, partly in section, of a steam generator provided with antivibratory bars in accordance with the invention, FIG. 2 is a view in perspective of a part of an antivibratory bar according to the invention, in a first embodiment of the latter, FIG. 3 is a view in longitudinal section on the line 3—3 in FIG. 2, FIG. 4 is a view in cross-section on the line 4—4 in FIG. 3, FIG. 5 is an exploded perspective view of a part of the wedging members of the antivibratory bar shown in FIGS. 2, 3 and 4, FIG. 6 is a view in perspective of the end of one of the wedging members and of its displacement means, FIG. 7 is a view in perspective of a part of an antivibratory bar according to the invention, in a first variant embodiment, FIG. 8 is a view in cross-section of the antivibratory bar shown in FIG. 7, FIG. 9 is a view in perspective of the wedging members of the antivibratory bar shown in FIGS. 7 and 8, FIG. 10 is a view in perspective of an antivibratory bar according to the invention, in a second variant embodiment of the latter, and FIG. 11 is a view in cross-section of the antivibratory bar shown in FIG. 10.

In FIG. 1 can be seen a steam generator comprising an outer casing 1 in which is disposed a bank of tubes 2 inside a tube bank casing 3. The tubes 4 of the band 2 are U-shaped and their ends pass through a tube plate 5, in which they are fixed.

Each of the U-shaped tubes of the bank comprises two vertical branches 4a and 4b and a bend 4c of semicircular shape. The tubes 4 shown in FIG. 1 have their ends fixed in holes disposed, in the tube plate 5, in a rectilinear row. These tubes 4 constituting a row in the tube bank have their axes placed in the same vertical plane, which is the sectional plane of FIG. 1. The tubes 4 have bends whose radiuses decrease from the periphery of the bank to the central part.

The straight branches 4a and 4b of the tubes 4 are supported against transverse stresses by braces 6 distributed over the height of the tube bank.

The bends 4c of the tubes forming successive rows are separated by a space of relatively slight width in the direction at right angles to the plane of FIG. 1, this distance being approximately constant from one row of tubes 4 to another.

In order to avoid vibration of the bends 4c in the direction at right angles to the rows, a set of V-shaped antivibratory bars 7 is inserted into each of the spaces between two rows, each bar being composed of two branches 7a and 7b connected by an articulation 8. The antivibratory bars 7 are held in the top part of the tube bank, known as the "chignon", by retaining rings 10.

In FIG. 2 can be seen a part of a branch 7a of an antivibratory bar corresponding to its end lying near the outer surface of the "chignon". This branch 7a comprises a support 11 and wedging members 12, 13 and 14.

As can be seen in FIG. 4, the support 11 is composed of a hollow sectional member of rectangular shape with rounded corners. This hollow rectangular section is composed of two channel sections joined together along their longitudinal side edges. The support 11 is provided on its flat top and bottom faces with a succession of openings 15 of rectangular shape, disposed along the length of the support 11 with constant spacing.

It can be seen in FIGS. 3 and 5 that the wedging members 12 and 13 are each composed of a sheet metal strip folded to form successive crenellations along the length of the sheet metal strip. After being folded, each of the metal strips comprises flat portions 16 separated by rounded portions 17 of substantially cylindrical shape. The members 12 and 13 are in addition provided with a rim 18 folded over at 90° at their end.

The wedging member 14 is composed of a flat strip provided with successive regularly spaced openings 20 passing through the entire thickness of the flat strip. arrangement and dimensions of the openings 15 in the sectional support 11, of the support surfaces 16 of the members 12 and 13, and of the openings 20 in the member 14 are such that it is possible to form an antivibratory bar assembly such as that illustrated. In particular, the openings 15 have dimensions slightly larger than the flat support parts 16 of the members 12 and 13, so that these flat support parts can project laterally to a slight extent in relation to the faces of the support 11 in their locking position, as will be indicated further on. In this position the parts 17 of the members 12 and 13 bear against intermediate portions 21 separating the openings 20 in the member 14.

The member 14 has an end portion 22 which is in the form of a clevis provided with a circular through hole 23 and carrying a pin 24 rigidly fastened on the clevis 22.

The pin 24 fastened to the clevis 22 has between the two branches of the latter a free portion which is accessible to the hooking portion 25a of a puller tool 25, as can be seen in FIG. 6.

The clevis 22 of the member 14 is intended to enter the end portion of the sectional support 11 when the antivibratory bar is assembled. In this end portion the sectional support 11 has two openings spaced a certain distance apart in the longitudinal direction of the antivibratory bar.

Each of the antivibratory bars comprises two identical branches 7a and 7b connected together at one end by means of an articulation member 8 after the style of compass legs.

The ends of the branches 7a and 7b connected together by the articulation member 8 correspond to that end of the antivibratory bar which is situated at the interior of the "chignon". The outer ends of the antivibratory bars 7 consist of those ends of the branches 7a and 7b which are fitted with the end clevises 22 of the corresponding members 14.

FIG. 2 shows the outer end of the branch 7a on the antivibratory bar.

An antivibratory bar is assembled and used in the manner which will be described below.

The members 12 and 13 consisting of strips folded to form crenellations are inserted into and fixed in the corresponding supports 11 of the two branches 7a and 7b of the antivibratory bar, in such a manner that the flat support surfaces 16 are directed towards the exterior of the support 11 and are engaged in the openings 15. The members 12 and 13 are provided with a tongue folded over at 90°, such as the tongue 18, at each end, this tongue being engaged in corresponding slots in the support 11 on assembly.

The cylindrical support surfaces 17 of the members 12 and 13 are directed towards the inside, and the wedging member 14 is inserted between the members 12 and 13 in such a manner that the inner support surfaces 7 are each in line with an opening 20 in the flat strip 14. The opening 23 in the clevis 22 is then situated in line with the opening 26 in the support 11. A locking stud 30, as shown in FIG. 6, can then be introduced into the coinciding openings 26 and 23 in order to hold the wedging member 14 in the position described above, which corresponds to the unlocking of the antivibratory bar. The two wedging members 12 and 13 can in fact then come into contact at their inner support portions 17, the outer support portions 16 then being in the retracted position inside the sectional support 11. The branches of the antivibratory bar have a thickness corresponding to the thickness e (FIG. 4) of the sectional support 11. This thickness e is less than the width of the space separating two rows of tubes 4 between which the antivibratory bar is introduced, as can be seen in FIG. 3.

The antivibratory bars according to the invention are therefore introduced without difficulty between the rows of tubes 4 constituting the "chignon" of the steam generator. The antivibratory bars 7 are introduced while in their folded position, with the two compass legs folded up towards one another.

The two outer ends of the branches 7a and 7b are then opened out so as to reach their definitive position near the outer surface of the "chignon". The ends of the antivibratory bars are held in position by the rings 10 shown in FIG. 1.

The ends of the branches of the antivibratory bars then project outside the "chignon" and are accessible to an operator effecting the locking.

This locking operation is carried out by removing the locking stud 30 from the openings 26 and 23 and introducing the hooking portion 25a of the puller device 25 between the branches of the clevis 22, in such a manner as to come into engagement with the pulling pin 24. A pull is then applied to the end of the member 14 by way of the pin 24, utilizing the device 25, to bring this wedging member 14 into its locking position, as shown in FIGS. 2 and 3. The inner support surfaces 17 of the members 12 and 13 then bear against the intermediate portions 21 of the flat strip constituting the member 14. In this position the opening 23 in the clevis 22 coincides with the opening 27 in the sectional support 11. The locking stud 30 is then inserted into the openings 27 and 23. The same operation is carried out for the two branches of the antivibratory bar, which is then secured in its locking position. In this position the two wedging members 12 and 13 have been moved away from one another towards the outside by the portions 21 of the flat strip 14.

The antivibratory bar bears against the tubes 4, constituting each of the rows between which it is inserted, by means of the flat support parts 16 of the members 12 and 13. These parts 16 are therefore spaced apart by a distance corresponding exactly to the pitch of the bank of tubes 4.

If there should be a difference between the diameters of two successive tubes 4, or in the event of a slight fault in the positioning of these tubes, the elasticity of the strips 12 and 13 folded to form crenellations easily enables the local faults to be taken up. In this case, in fact, the corresponding part of the strip 12 or of the strip 13 pivots slightly about the generatrix of contact between the support surface 17 and the portion 21 of the flat strip, in order to accommodate the defect.

In the case of steam generator tubes of a diameter close to 20 millimeters the width of the space between the rows of tubes being slightly greater than 10 millimeters, stainless steel strips of a thickness of 1 or 1.5 millimeters were used to make the members 12 and 13. The member 14 was made from a strip of a thickness of 3 millimeters. The crenellations of the members 12 and 13 have a height of the order of 4 millimeters. The thickness e of the sectional member 11 is 10 millimeters. The sectional member 11 is also made of stainless steel, while the flat member 14 may be made of chrome steel in order to reduce wear of the intermediate portions 21 in contact with the inner support parts 17 of the members 12 and 13 of stainless steel, which are also chromium-plated.

The width l of the sectional member 11 (see FIG. 4) is of the order of 30 to 40 millimeters.

Those edges of the openings 20 in the member 14 which delimit the intermediate zones 21 are rounded in order to facilitate the engagement of these intermediate parts 21 between the inner support faces 17 of the members 12 and 13 at the moment when the antivibratory bar is locked. Since the angle of attack of the parts 17 of cylindrical shape on the intermediate parts 21 is variable, it is possible to have the maximum clamping force at the end of the stroke without increasing the total tensile load on the strip 14.

The antivibratory bar of the kind described makes it possible to take up clearance or a difference in diameter between neighbouring tubes of the order of 0.07 millimeter, this being done by elastic flexural deformation of the member 12 or 13, with a deflection of 0.07 millimeter. The maximum stress in the strip folded into crenellations is of the order of 150 MPa. The clamping force on the tube 4 is then 110 N.

When use is made of crenellated strip of a thickness of 1 millimeter instead of 1.5 millimeter, for the same stress of 150 MPa the deflection is 0.1 millimeter instead of 0.07 millimeter and the clamping force on the tube is 50 N. The apparatus therefore offers great flexibility in adaptation to the requirements of the tube bank.

The apparatus according to the invention, whose design and utilization are simple, therefore makes it possible to achieve effective and regular antivibratory wedging and to absorb small differences in diameter and small defects in the positioning of the tubes in the tube bank of the steam generator.

The embodiment shown in FIGS. 2 to 6 nevertheless requires the antivibratory bar to be placed in position relatively accurately in the "chignon", each of the successive flat parts 16 of the members 12 and 13 having to come to bear against a tube 4 of the steam generator with a tolerance of plus or minus half a pitch.

The variants shown in FIGS. 7 to 9 and 10 and 11 respectively enable this requirement concerning the placing in position of the antivibratory bars to be dispensed with.

In a first variant, illustrated in FIGS. 7, 8 and 9, each of the branches of the antivibratory bar has a sectional support 31 whose hollow section has the shape of a rectangle open on one of its large sides so as to form a longitudinal slot 38 over the entire length of the antivibratory bar.

As can be seen in FIGS. 7, 8 and 9, the branch of the antivibratory bar contains inside the sectional support 31 a wedging member 32 consisting of a metal strip folded to form crenellations, a flat strip 34 having successive openings 40 in the longitudinal direction, and a sectional support plate 33 of T-shaped section, bearing by its face of larger section against one face if the flat strip 34.

The strip 32 folded into crenellations comprises successive support surfaces 36 and 37 directed respectively towards the exterior and the interior of the antivibratory bar. The faces 36 bear against the inner surface if the sectional member 31 and are fixed on said surface by spot welding 35. The flat surfaces 37 bear against the flat strip 34 on the face of the latter remote from the plate 33.

In FIG. 9 the apparatus has been shown in its locked position, with the flat strip 34 in contact with the strip 32 folded into crenellations at its flat support surfaces 37, this contact being made by its intermediate portions 39 interposed between the openings 40.

As previously, the antivibratory bar is placed in position in the "chignon" of the steam generator while in its unlocked position, the flat strip 34 being disposed in such a manner that the openings 40 are each situated in line with a flat support face 37 of the strip 42. Locking is then effected by longitudinal displacement of the flat strip 34, thus bringing its intermediate portions 39 into contact with the support surfaces 37.

The wedging of the tubes 4 disposed in two rows, between which the bar is introduced, is effected by means of the outer surface of the sectional member 31 and the small face of the plate 33. This apparatus makes it possible to avoid having to position the bar very accurately in relation to the row of tubes 4. However, this apparatus does not permit absorption of differences of diameter between the tubes or any defects in positioning with the same efficiency as the apparatus shown in FIGS. 2 to 6.

FIGS. 10 and 11 illustrate a second variant construction of an antivibratory bar 47 according to the invention, which comprises a sectional support 41 in which are held a metal strip 42 folded into crenellations and a flat strip 44 having successive openings 50. The strip 42 folded into crenellations has flat external support surfaces 46 and flat internal support surfaces 45. The flat internal support surfaces 45 come into contact with the flat strip 44. The support 41 is provided with cutouts 48 permitting the passage of the outer part of the strip 42 folded into crenellations, that is to say the outer support surfaces 46. The outer part of the strip 42 folded into crenellations is fastened to a plane support plat 43 fixed at each of the outer support surfaces 46.

The clamping of the tubes 4 is effected between the outer surface of the sectional member 41 and the support plate 43. The locking and unlocking of the apparatus are achieved, as previously, by moving the flat strip 44 between two positions in the longitudinal direction of the bar 47. In one of these positions, the locking position, which is shown in FIG. 10, the support surfaces 45 of the strip 42 are in contact with intermediate portions 49 of the flat strip 44, which lie between the openings 50. In the unlocked position of the antivibratory bar 47 the support surfaces 45 are placed in line with the openings 50.

The invention is not restricted to the embodiments which have been described.

Thus, it is possible to conceive strips folded into crenellations having different shapes from those which have been described. It is possible to imagine the use of one or two strips folded into crenellations which come to bear directly against the tubes or do so with the interposition of plane plates or support strips.

Finally, the apparatus according to the invention can be used in applications different from antivibratory bars of a steam generator, and generally for wedging any components of an installation which are disposed in such a manner as to constitute successive rows separated by a space of substantially constant width.

I claim:

1. Apparatus for the antivibratory wedging of component parts (4) of an installation which are disposed in such a manner as to form successive rows separated by a space of substantially constant width, which apparatus is intended to be inserted between two successive rows and is composed of a sectional member (11, 31, 41) having a hollow section, in which are disposed at least two wedging members (12, 13, 14) mounted for movement relative to one another in the longitudinal direction of the sectional member and having complementary operating surfaces and a relative longitudinal displacement means, in such a manner as to be displaced relative to one another both in the longitudinal direction and in the transverse direction corresponding to the direction of the width of the rows, at least one of the wedging members (12, 13) coming to bear against component parts (4) disposed in a row, characterized by the fact that at least one of the wedging members (12, 13) is in the form of an elastic metal strip folded in such a manner as to form transverse crenellations disposed in succession in the longitudinal direction, and having opposite support faces (16, 17; 36, 37; 45, 46) directed in the one case towards the interior of the sectional support (11, 31, 41) and in the other case towards the outside, and a flat strip (14, 34, 44) provided with openings (20, 40, 50) separated by intermediate portions (21, 39, 49) of the flat strip and whose dimensions and arrangement along the length of the strip (14, 34, 44) correspond to the dimensions and arrangement of the inner support surfaces (17, 37, 45) of the folded strip (12, 13; 32, 42); the longitudinal displacement means being associated with the flat strip (14, 34, 44) for the displacement of the latter between an unlocked position, in which the inner support surfaces (17, 37, 45) coincide with the openings (20, 40, 50) in the flat strip, and a locked position in which the inner support surfaces are in contact with the intermediate portions (21, 39, 49) of the flat strip between the openings (20, 40, 50).

2. Wedging apparatus according to claim 1, wherein it comprises a strip (32) folded into crenellations and whose outer support surfaces (36) bear against the inner surface of the sectional member (31), and whose inner support surfaces (37) bear against the flat strip (34), which in turn is in contact with a support plate (33) of which a part projects in relation to the outer surface of the sectional support (31), 3. Wedging apparatus according to claim 1, wherein it has a metal strip (42) folded into crenellations and having a part situated outside the sectional support (41) and having outer support surfaces (46), and a part inside the sectional support (41) and having inner support surfaces (45) in contact with the flat strip (44).

4. Wedging apparatus according to claim 1, wherein the edges of the openings (20, 40, 50) delimiting the intermediate portions (21, 39, 49) of the flat strip (14, 34, 44) are rounded or inclined in such a manner as to facilitate the displacement of the flat strip (14, 34, 44) in the locking direction.

5. Wedging apparatus according to claim 1, wherein it comprises two wedging members (12, 13) each consisting of an elastic metal strip folded in such a manner as to form crenellations having support surfaces (16) directed towards the outside of the sectional membre (11) and passing through openings (15) provided in the support (11), and of a flat strip (14) interposed between inner support surfaces (17) of the strips (12, 13) folded into crenellations.

6. Wedging apparatus according to claim 5, characterized by the fact that the inner support surfaces of the strips folded into crenellations have a substantially cylindrical shape.

7. Wedging apparatus according to claim 1, wherein the flat strip (14, 34, 44) has an end portion (22) in which an opening (23) is provided and that the sectional support (11) has a corresponding end portion intended to receive the end portion (22) of the flat strip (14, 34, 44) and having two openings (26, 27) situated in such a manner as to coincide with the opening (23) in the locked position and in the unlocked position respectively, the wedging apparatus being further provided with a securing stud (30) adapted to be introduced into the openings (23, 26) and (23, 27) respectively.

8. Wedging apparatus according to claim 7, wherein the end portion (22) of the flat strip (14, 34, 44) is in the form of a clevis having two branches and is in addition provided with a puller pin (24) accessible between the two branches of the clevis (22).

9. Utilization of a wedging apparatus according to any one of claims 1 to 8, to constitute at least one of the branches (7a, 7b) of an antivibratory bar disposed in the top part or "chignon" of a bank of tubes (4) of a pressurized water steam generator.

10. Utilization according to claim 9, characterized by the fact that the wedging apparatuses (7a, 7b) are associated in pairs to form an antivibratory bar and are articulated at one end after the style of compass legs.

* * * * *